(12) United States Patent
Huang

(10) Patent No.: US 8,403,301 B2
(45) Date of Patent: Mar. 26, 2013

(54) FASTENER FOR STRAP

(75) Inventor: Han-Ching Huang, Changhua County (TW)

(73) Assignee: Yeu Yeuh Enterprises Co., Ltd. (TW)

( * ) Notice: Subject to any disclaimer, the term of this patent is extended or adjusted under 35 U.S.C. 154(b) by 339 days.

(21) Appl. No.: 12/662,633

(22) Filed: Apr. 27, 2010

(65) Prior Publication Data
US 2011/0233493 A1 Sep. 29, 2011

(30) Foreign Application Priority Data
Mar. 26, 2010 (TW) ................................ 99109246 A

(51) Int. Cl.
*B21F 9/00* (2006.01)
*B66F 3/00* (2006.01)
(52) U.S. Cl. ....... 254/218; 254/223; 254/225; 24/69 ST; 24/69 CT; 24/71 ST
(58) Field of Classification Search ................... 254/214, 254/217, 218, 223, 225, 239; 24/68 R, 69 ST, 24/69 CT, 71 ST, 71.1
See application file for complete search history.

(56) References Cited

U.S. PATENT DOCUMENTS

| | | | | |
|---|---|---|---|---|
| 4,622,721 A * | 11/1986 | Smetz et al. | ............... | 24/68 CD |
| 5,611,520 A * | 3/1997 | Soderstrom | ................... | 254/218 |
| 5,904,341 A * | 5/1999 | Norrby | ......................... | 254/243 |
| 6,102,371 A * | 8/2000 | Wyers | ........................... | 254/218 |
| 6,609,275 B1 * | 8/2003 | Lin | ............................ | 24/68 CD |
| 7,100,902 B1 * | 9/2006 | Lu | ................................ | 254/218 |
| 7,281,701 B1 | 10/2007 | Huang et al. | | |
| 7,296,326 B2 * | 11/2007 | Madachy et al. | ......... | 24/68 CD |
| 7,350,767 B2 * | 4/2008 | Huang | ......................... | 254/218 |
| 7,861,382 B1 * | 1/2011 | Madachy et al. | ......... | 24/68 CD |
| 7,877,846 B1 * | 2/2011 | Chen et al. | ................. | 24/68 CD |
| 8,172,203 B2 * | 5/2012 | Chou | ........................... | 254/225 |

FOREIGN PATENT DOCUMENTS
WO WO 2008/039073 A1 4/2008

* cited by examiner

*Primary Examiner* — Emmanuel M Marcelo
(74) *Attorney, Agent, or Firm* — Bacon & Thomas, PLLC

(57) ABSTRACT

A fastener includes a frame; a rotary shaft mounted to the frame and having a passage running through a center thereof; two ratchet wheels, a first lock member; a handle pivoted to the rotary shaft; a second lock member movably mounted to the handle and having an operation portion for a user's hand to operate to force the second lock member to disengage from the ratchet wheels; a rewinding member mounted to the handle and having a reel, a spring coil, and a shell; and a strap having two ends, one of which is mounted to the rewinding member and the other passes through the passage, and are wound around the rewinding member. Accordingly, the fastener allows the user to conveniently rewind the strap to enhance the user's operational hand feel.

8 Claims, 6 Drawing Sheets

FASTENER FOR STRAP

BACKGROUND OF THE INVENTION

1. Field of the Invention

The present invention relates generally to means for fastening a strap or rope, and more particularly, to a fastener for a strap or rope.

2. Description of the Related Art

Among the conventional fasteners for straps, World Patent Pub. No. 2008/039073 as an example disclosed that the rope is conveniently reelable, being characterized in that the rope is mounted to the base by the resilient rewinding device and the resilient rewinding device is separate from the tightening device.

In addition, another conventional fastener for strap disclosed in U.S. Pat. No. 7,281,701 works like that the user can operate the handle to enable the first dent and the second dent to depart from the ratchet wheel to facilitate rotation of the reel for conveniently reeling the rope.

SUMMARY OF THE INVENTION

The primary objective of the present invention is to provide a fastener for a strap, which allows the user to conveniently rewind the strap.

The secondary objective of the present invention is to provide a fastener for a strap, which is structurally different from the aforesaid prior art and can enhance the user's operational hand feel.

The foregoing objectives of the present invention are attained by the fastener composed of a frame, a rotary shaft, two ratchet wheels, a first lock member, a handle, a second lock member, a rewinding member, and a strap. The frame includes a first end and a second end. The rotary shaft is mounted to the second end of the frame and includes a passage running through a center thereof. The two ratchet wheels are sleeved onto two ends of the rotary shaft respectively and rotatable along with the rotary shaft. The first lock member is movably mounted to the frame for engaging or disengaging from the ratchet wheels. The handle includes a first end, a second end pivoted to the rotary shaft, and a push portion formed at the second thereof for pushing the first lock member backward, while the handle pivots to a predetermined angle, in such a way that the first lock member can disengage from the ratchet wheels. The second lock member is movably mounted to the handle for engaging or disengaging from the ratchet wheels and includes an operation portion for a user's hand to operate to force the second lock member to disengage from the ratchet wheels. The rewinding member is mounted to the handle and includes a reel, a spring coil, and a shell. The strap includes two ends, one of which is mounted to the rewinding member and the other passes through the passage, and are wound around the rewinding member.

DETAILED DESCRIPTION OF PREFERRED EMBODIMENTS

Figure 4:
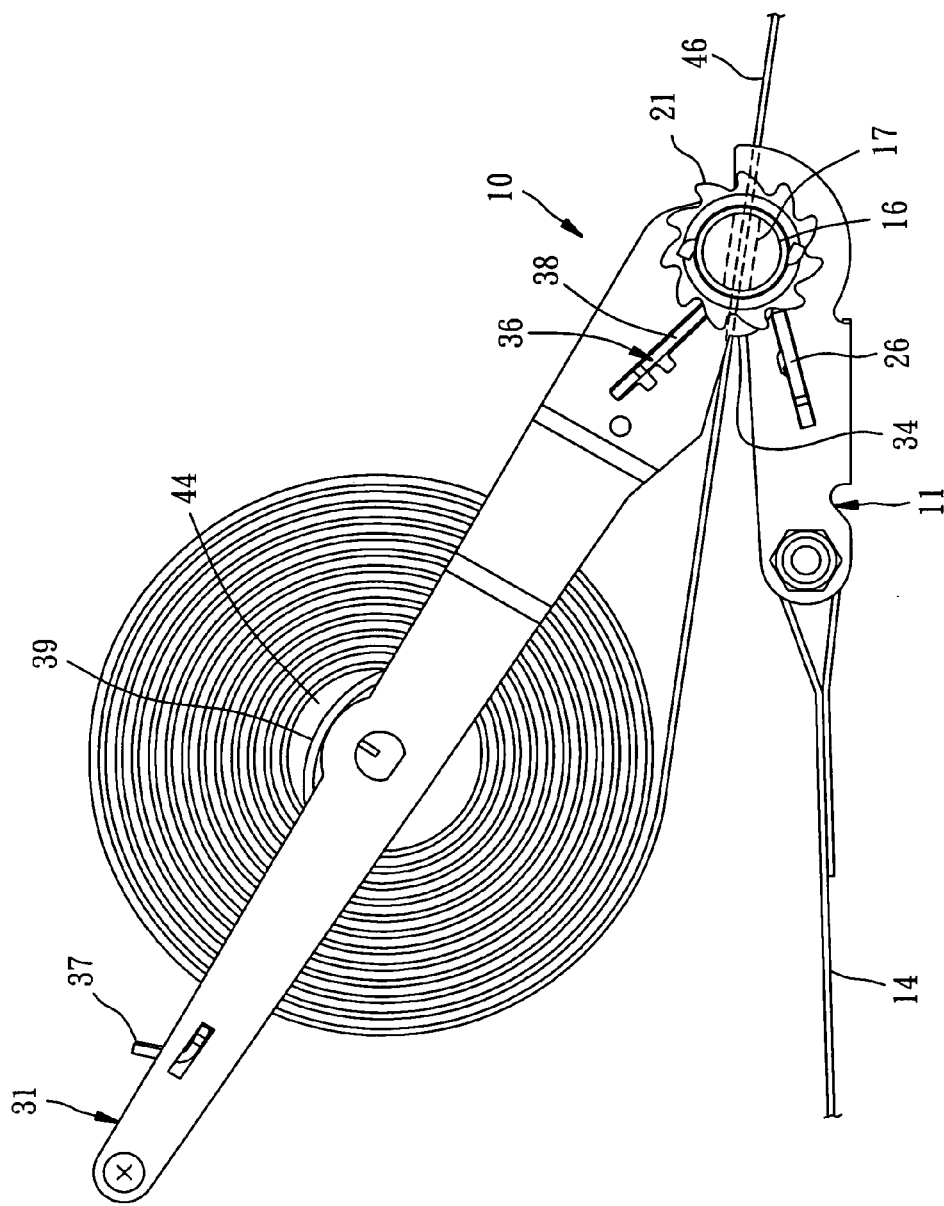
FIG. 4 is another side view of the first preferred embodiment of the present invention in operation.
Figure 5:
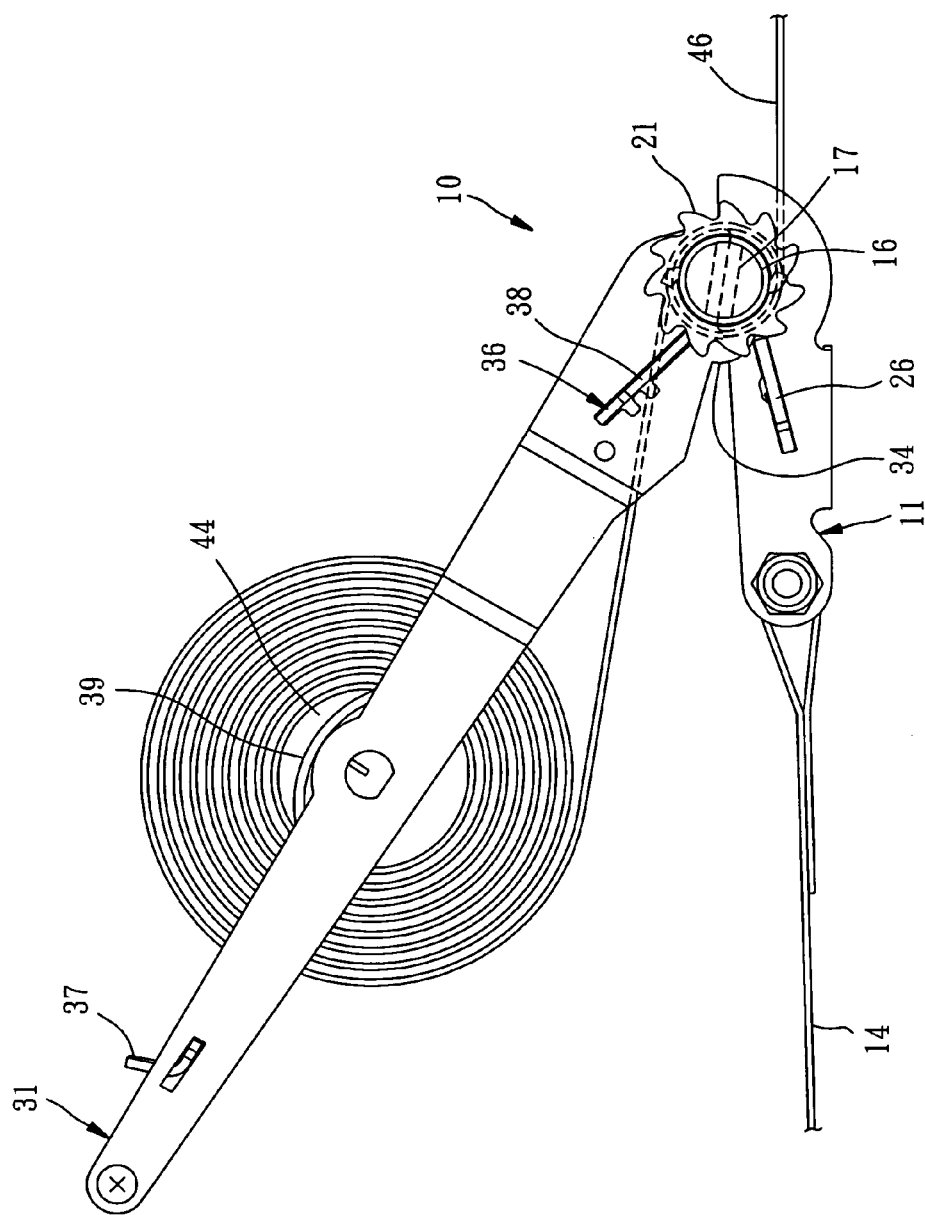
FIG. 5 is another side view of the first preferred embodiment of the present invention in operation.

Referring to FIGS. 1-4, a fastener 10 constructed according to a first embodiment of the present invention is composed of a frame 11, a rotary shaft 16, two ratchet wheels 21, a first lock member 26, a handle 31, a second lock member 36, a rewinding member 41, and a strap 46. The detailed descriptions and operations of these elements as well as their interrelation are recited in the respective paragraphs as follows. In addition, for clearer indication in the drawings, FIGS. 1-3 though do not show that the strap 46 passes through the passage 17, but FIGS. 4 and 5 show so.

The frame 11 includes a first end 12 and a second end 13. A rope is mounted to the first end 12.

The rotary shaft 16 is mounted to the second end 13 and includes a passage 17 running through a center thereof.

The two ratchet wheels 21 are sleeved onto two ends of the rotary shaft 16 for linking-up rotation with the rotary shaft 16.

The first lock member 26 is movably mounted to the frame 11 for engaging or disengaging from the ratchet wheels 21.

The handle 31 includes a first end 32 defining a handhold portion 311 for a user to hold, a second end 33 pivoted to the rotary shaft 16, two lateral portions 35, and a push portion 34 formed at the second end 33. When the handle 31 pivots to a predetermined angle relative to the frame 11, the push portion 34 pushes the first lock member 26 backward to enable the first lock member 26 to disengage from the ratchet wheels 21. In this embodiment, the push portion 34 is a cam.

The second lock member 36 includes an operation portion 37, a lock portion 38, and two side portions 39. The operation portion 37, the two side portions 39, and the lock portion 38 jointly define a hollow frame body. The second lock member 36 is movably mounted to the handle 31. The lock portion 38 is away from the handhold portion 311 for engaging or disengaging from the ratchet wheels 21. The operation portion 37 is close to the handhold portion 311 for the user's hand to operate. The two side portions 39 are located between the two lateral portions 35.

The rewinding member 41 is mounted to the handle 31 and includes a reel 42, a spring coil 43, and a shell 44. The reel 42 has its two ends be fixed to the two lateral portions 35 respectively to be located between the two lateral portions 35. The shell 44 is rotatably mounted to the reel 42. The spring coil 43 is received in the shell 44, having two ends mounted to the reel 42 and the shell 44 respectively.

The strap 46 has one of its two ends mounted to the shell 44 and is wound around the shell 44 to be located between the two side portions 39 of the second lock member 36. The other end of the strap 46 passes through the passage 17 of the rotary shaft 16. For convenient indication, the coiled strap 46 is shown by that its coils are spaced from each other in the drawings; actually, the coils of the coiled strap 46 contact each other.

Referring to FIG. 4, while it is intended to operate the fastener 10, the strap 46 is pulled out for bundling something. While the strap 46 is pulled out, the strap 46 can pass through the passage 17 without any interference. After a distal end of the strap 46 and a distal end of the rope 14 are fastened that is not shown in any drawings because it belongs to the prior art, the user can hold the handhold portion 311 and force the handle 31 to pivot back and forth relative to the frame 11; meanwhile, the first lock member 26 and the lock portion 38 of the second lock member 36 can engage or disengage from the ratchet wheels 21, such that the rotary shaft 16 can be forced for unidirectional rotation to force the strap 46 to be wound around the rotary shaft 16 and finally the strap 46 can be tightened, as shown in FIG. 5. How the first lock member 26, the lock portion 38 of the second lock member 36, and the ratchet wheels 21 interact with each other is identical to the prior art, such that no more detailed recitation is necessary. In addition, in the process of pulling out the strap 46, the shell 44 can be forced for linking-up rotation, such that the spring coil 43 can accumulate converse resilience.

When it is intended to release the tightness of the strap, the user can operate the handle 31 to enable it to pivot to a predetermined angle and to force the push portion 34 to work on the first lock member 26 in such a way that the first lock member 26 can disengage from the ratchet wheels 21; meanwhile, the user can operate the operation portion 37 to enable the lock portion 38 to disengage from the ratchet wheels 21, where such operation likewise regards the interrelation between the first lock member 26, the lock portion 38, and the ratchet wheels 21 to be identical to the prior art, such that none of any drawings illustrates the operation is necessary. In the meantime, the rotary shaft 16 becomes freely rotatable and then the tension of the strap 46 can force the rotary shaft 16 to rotate to be restituted as shown in FIG. 4; meanwhile, the strap 46 is not wound around the rotary shaft 16 but passes through the passage 17. After the distal end of the strap 46 is unfastened, the accumulated converse resilience of the spring coil 43 (FIG. 2) can force the shell 44 to conversely rotate to rewind the strap 46 and keep rewinding the strap 46 until the strap 46 is restituted as it is before the operation.

Figure 1:
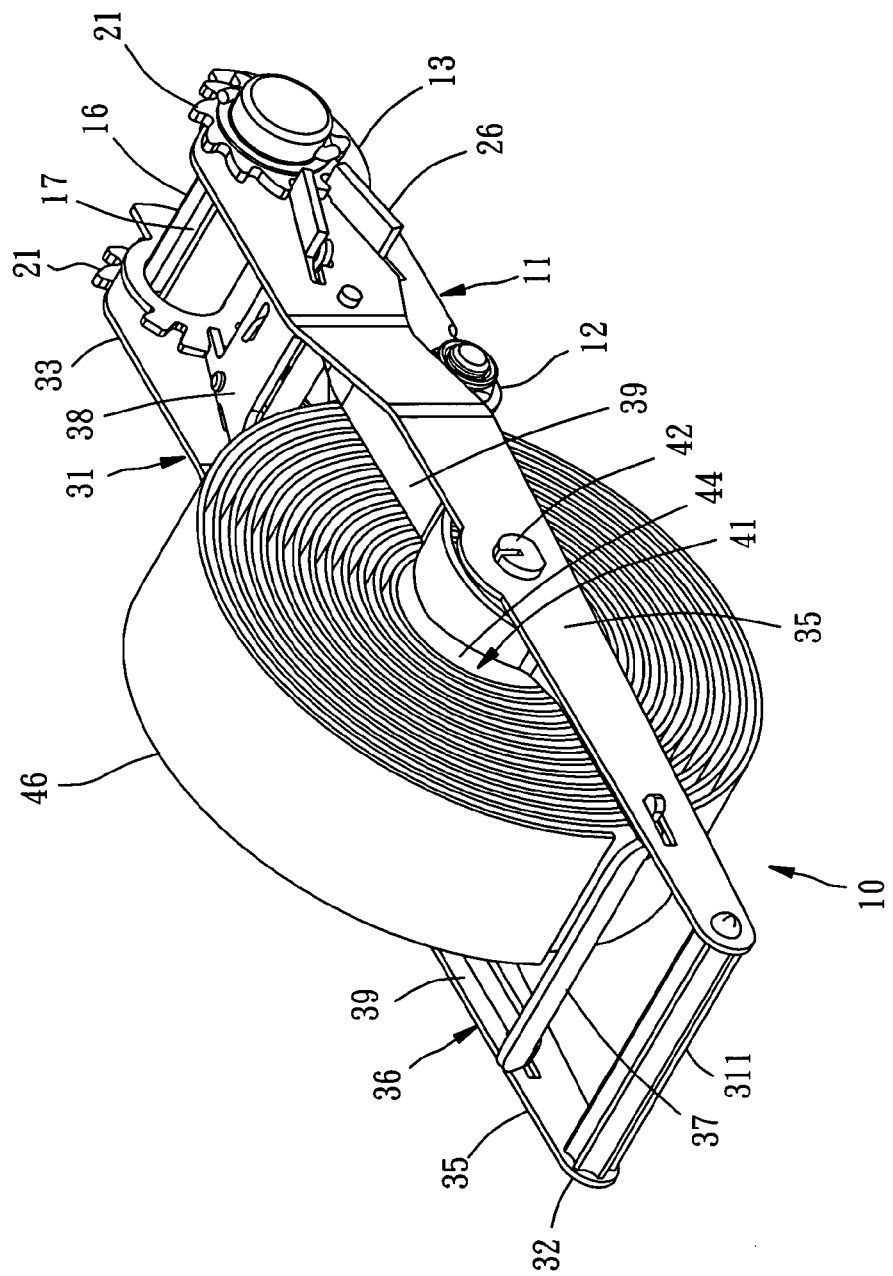
FIG. 1 is a perspective view of a first preferred embodiment of the present invention.
Figure 2:
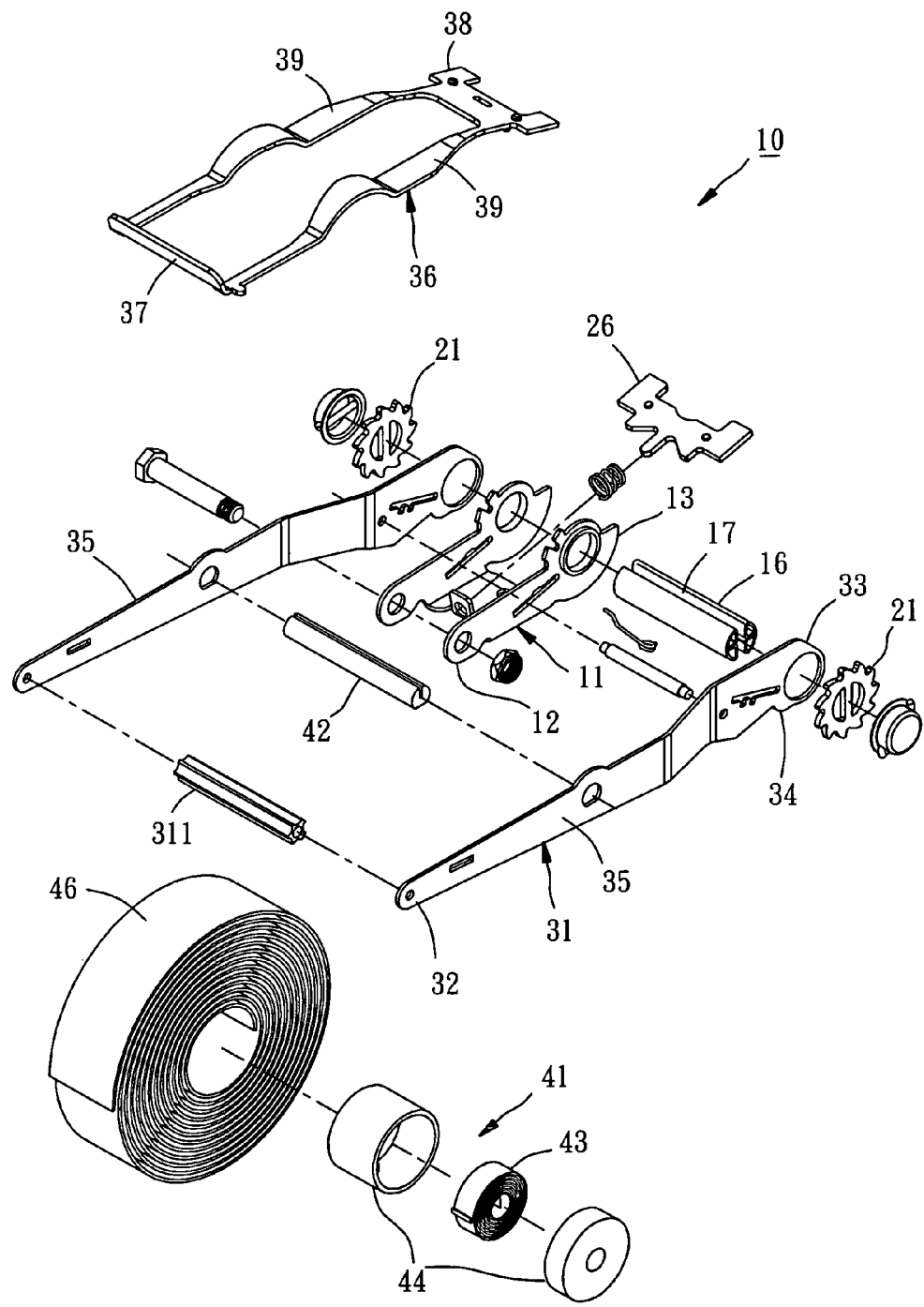
FIG. 2 is an exploded view of the first preferred embodiment of the present invention.
Figure 3:
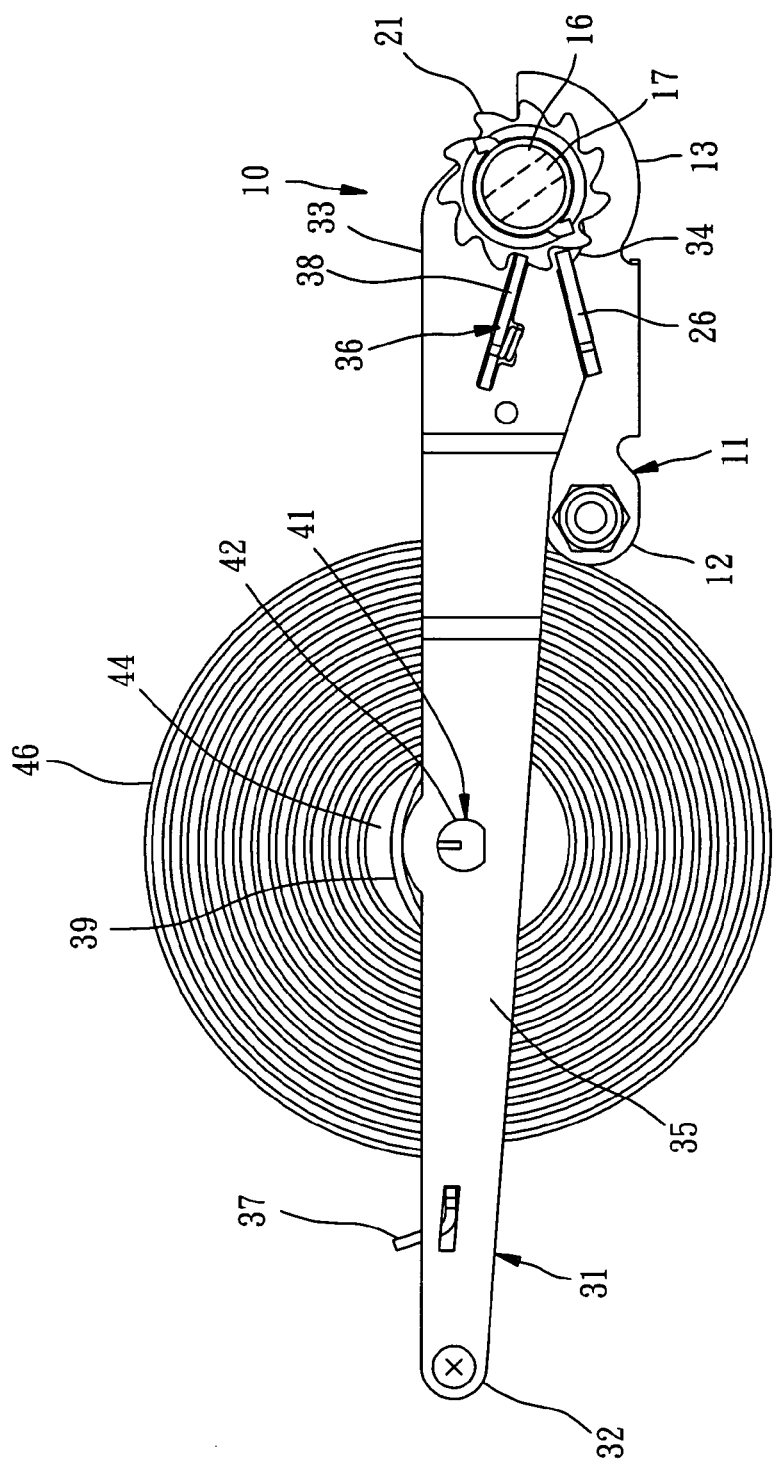
FIG. 3 is a side view of the first preferred embodiment of the present invention.

In the process of the rewinding the strap 46, the two side portions 39 can also be employed for refraining the strap 46, as shown in FIG. 1. Because the strap 46 is located between the two side portions 39, while the strap 46 is being rewound, if the strap 46 is skew, the two side portions 39 can correct the skew of the strap 46 to ensure that the strap 46 is correctly rewound. Besides, the strap 46 and the rewinding member 41 are both located at the handle 31, the user can feel the operational status of the strap 46 while operating the handle 31.

Figure 6:
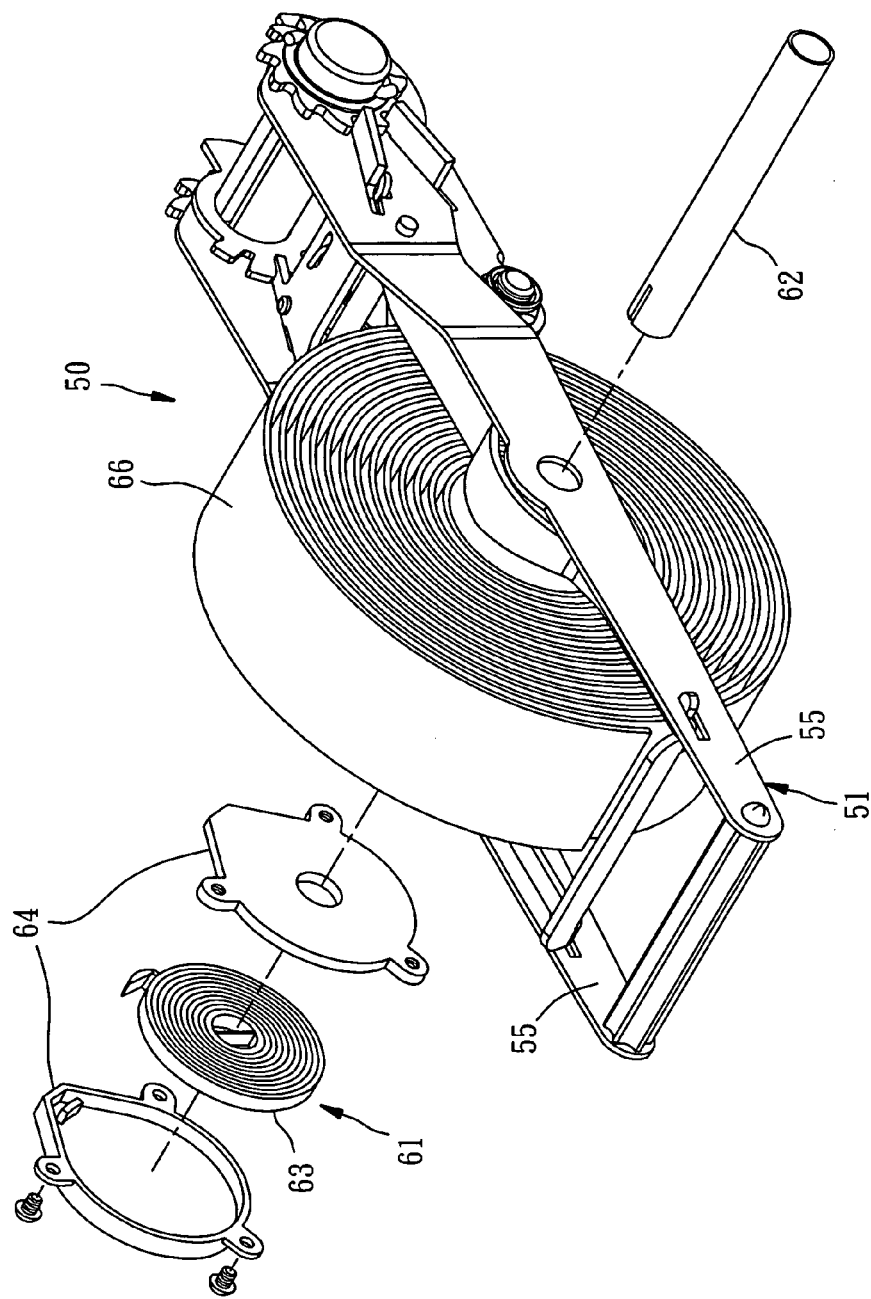
FIG. 6 is an exploded view of a part of a second preferred embodiment of the present invention.

Referring to FIG. 6, a fastener 50 constructed according to a second embodiment of the present invention is similar to that of the first embodiment, having the difference recited in the respective paragraphs.

The reel 62 of the rewinding member 61 has its two ends be rotatably mounted to the lateral portions 55 of the handle 51 to be located between the lateral portions 55. The shell 64 is fixed to one of the lateral portions 55 to be located outside the handle 51, corresponding to the reel 62. The spring coil 63 is received in the shell 64, having two ends mounted to the reel 62 ad the shell 64.

The strap 66 is provided with one end mounted to the reel 62 and wound around the reel 62.

The operation of the second embodiment is also similar to that of the first embodiment but different in that the shell 64 is stationary rather than rotatable, the reel 62 can be pulled by the strap 46 to rotate, and the spring coil 63 provides the converse resilience for the reel 62.

The effects that the second embodiment can reach are also similar to those of the first embodiment but different in that the strap 46 is only wound around the reel 62 other than the shell 64 and thus the size of the winding strap 46 is relatively smaller.

It is to be noted that the two ends of the spring coil 63 in the second embodiments can be connected with the reel 62 and one of the lateral portions 55 of the handle 51 respectively for likewise generating and providing the converse resilience for the reel 62 after the reel 62 is rotated.

In conclusion, the present invention can attain the following effects and advantages.

1. As long as the user operates the handle 31 and the operation portion 37, the rotary shaft 16 can be freely rotatable and then the rewinding member 41 can do the rewinding operation, such that it is more convenient than the prior art for the user to rewind the strap 46 of the present invention.

2. The rewinding member 41 and the strap 46 are located on the handle 31 to be different from that the strap of the prior art that is located on the base. Besides, where the strap 46 is located on the handle 31 helps the user feel the operational status and the strap 46 and how much the strap 46 is used, thus enhancing the user's operational hand feel.

Although the present invention has been described with respect to specific preferred embodiments thereof, it is in no way limited to the specifics of the illustrated structures but changes and modifications may be made within the scope of the appended claims.

What is claimed is:

1. A fastener comprising:
a frame having a first end and a second end;
a rotary shaft mounted to the second end of the frame and having a passage running through a center thereof;
two ratchet wheels sleeved onto two ends of the rotary shaft for linking-up rotation with the rotary shaft;
a first lock member movably mounted to the frame for engaging or disengaging from the ratchet wheels;
a handle having a first end with a hand hold portion, a second end pivoted to the rotary shaft, and a push portion formed at the second end thereof; when the handle pivots to a predetermined angle relative to the frame, the push portion pushes the first lock member backward to enable the first lock member to disengage from the ratchet wheels;
a second lock member movably mounted to the handle for engaging or disengaging from the ratchet wheels, the second lock member having an operation portion for a users hand to operate the second lock member to disengage from the ratchet wheels;
a rewinding member mounted to the handle between the first and second end of the handle and having a reel, a spring coil, and a shell; and
a strap having two ends, one of which is mounted to the rewinding member and the other end passes through the passage, and wound around the rewinding member.

2. The fastener as defined in claim 1, wherein a rope is mounted the first end of the frame.

3. The fastener as defined in claim 1, wherein the handle comprises two lateral portions.

4. The fastener as defined in claim 3, wherein the reel comprises two ends each fixed to one of the two lateral portions to be located between the two lateral portions; the shell is rotatably connected with the reel; the spring coil is received in the shell and comprises two ends mounted to the reel and the shell respectively.

5. The fastener as defined in claim 4, wherein the handle comprises a handhold portion formed at its first end; the second lock member further comprises a lock portion and two side portions, the operation portion, the two side portions, and the lock portion jointly defining a hollow frame body, the operation portion being close to the handhold portion, the lock portion being away from the handhold portion, the two side portions being located between the two lateral portions.

6. The fastener as defined in claim 3, wherein the reel comprises two ends each rotatably mounted to one of the lateral portions to be located between the two lateral portions; the shell being fixed to one of the lateral portions to be located outside the handle and corresponding to the reel; the spring coil being received in the shell and having two ends mounted to the reel and the shell respectively.

7. The fastener as defined in claim 6, wherein the handle comprises a handhold portion formed at its first end; the second lock member further comprises a lock portion and two side portions, the operation portion, the two side portions, and the lock portion jointly defining a hollow frame body, the operation portion being close to the handhold portion, the lock portion being away from the handhold portion, the two side portions being located between the two lateral portions.

8. The fastener as defined in claim 1, wherein the push portion is a cam.

* * * * *